Nov. 28, 1967   D. W. JAMES   3,354,529
IMPELLER MAKING
Original Filed July 29, 1963
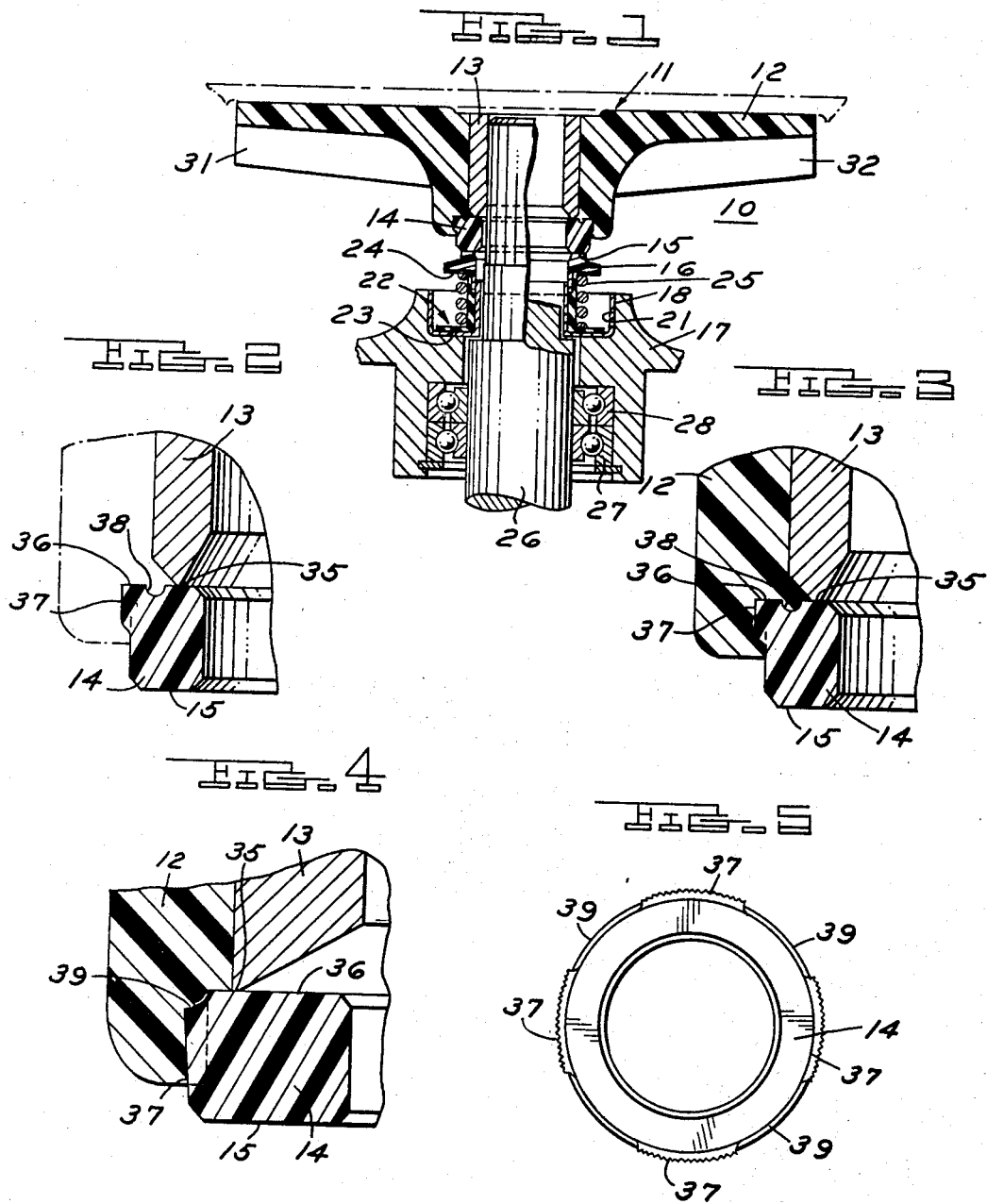
DAVID W. JAMES
INVENTOR.
BY John L. Faulkner
Keith L. Zerschling
ATTORNEYS

United States Patent Office 3,354,529
Patented Nov. 28, 1967

3,354,529
IMPELLER MAKING
David W. James, Allen Park, Mich., assignor to Ford Motor Company, Dearborn, Mich., a corporation of Delaware
Original application July 29, 1963, Ser. No. 298,158, now Patent No. 3,246,607. Divided and this application Oct. 19, 1964, Ser. No. 404,841
3 Claims. (Cl. 29—156.8)

This application is a division of copending application S.N. 298,158, filed July 29, 1963, now Patent No. 3,246,-607, in the name of David W. James, and assigned to the assignee of this application.

This invention relates to an impeller and to the method of making an impeller. More specifically, the invention relates to a plastic pump impeller and to the method of making a plastic pump impeller in which a ceramic sealing member and a metal hub are molded into the plastic material.

In present day passenger automotive vehicles the water pump impeller is constructed of cast iron. It is housed in a cast iron housing that rotatably supports the impeller shaft by means of a bearing. A sealing member carried by the housing and engaging the cast iron impeller provides a seal that is designed to exclude from the bearing water or the fluid that is being pumped. If water does reach this bearing it invariably reacts with the lubricant employed to lubricate the bearing and causes a bearing failure.

Considerable difficulty has been experienced with the pump construction described above. The sealing member carried by the housing has worn a groove in the cast iron and this has caused leakage of the seal. The bearings that journal the impeller shaft have in turn failed.

The present invention has been developed to solve this problem for passenger automotive vehicles where low cost and simplicity are essential. It comprises a plastic impeller body molded about a cylindrical metal hub and a ceramic sealing member. The cylindrical metal hub is adapted to receive the impeller driving shaft and the ceramic sealing member has an annular face adapted to engage a sealing member carried by the pump housing. The ceramic sealing member, preferably composed of aluminum oxide, is sufficiently hard that the sealing member carried by the pump housing will not wear it appreciably. This gives a long life seal and substantially eliminates bearing failures.

The pump impeller is made by placing the ceramic sealing member, preferably in the form of an annulus, in a mold. The metal hub has an annular frangible edge that is positioned against the ceramic sealing member. An axial force is applied to crush the frangible edge into sealing engagement with the ceramic sealing member. Plastic molding compound is injected into the mold around the circumference of the metal hub and ceramic sealing member to form the main body portion of the impeller. The molding compound molds the ceramic sealing member and the metal hub in place, and the crushed frangible edge of the metal hub member forms a seal between the metal hub and the ceramic sealing member so that the plastic molding compound that is injected around the periphery thereof does not enter the internal diameter of the hub and the sealing member.

The ceramic sealing member is preferably positioned coaxially with respect to the metal hub and has an internal diameter slightly greater than this metal hub. The molding operation leaves an exposed annular face positioned perpendicularly with respect to the axis of the metal hub and the shaft that is received by the metal hub. This annular face provides the sealing surface that engages the sealing member carried by the pump housing.

An object of the invention is the method of making a molded plastic pump impeller that has a ceramic sealing element and a metal hub molded into the main body portion of the impeller.

Other objects and attendant advantages of the invention will become more apparent as the specification is considered in connection with the attached drawings, in which:

FIGURE 1 is a partial sectional view of a pump assembly including the impeller of the present invention;

FIGURE 2 is a partial sectional view of the ceramic insert and the metal hub placed in contact with one another prior to manufacturing operations and showing a portion of the body of the impeller in phantom form;

FIGURE 3 is a view similar to FIGURE 2 showing the completed pump impeller;

FIGURE 4 is a view similar to FIGURE 3 of an alternate construction of the invention, and FIGURE 5 is a plan view of one form of the ceramic sealing member or insert used with the embodiment of the invention shown in FIGURE 4.

Referring now to the drawings in which like reference numerals designate like parts throughout the several views thereof, there is shown in FIGURE 1 a pump assembly 10 that includes a pump impeller 11 having a main body portion 12 of molded plastic. This main body portion 12 carries a metal hub 13 and a ceramic sealing member or insert 14 positioned in contact with the hub. The ceramic sealing member or insert 14 has an annular face or sealing surface 15 that cooperates with an annular sealing member 16 carried by the housing 17 of the pump assembly.

The annular sealing member 16 is supported in the housing 17 by means of a structure that includes a metal cup member 18 that is positioned within a counter bore 21 in the housing. This metal cup member may be sealed in the counter bore 21 by means of any suitable sealing compound. A flexible elastomeric sleeve 22 is carried by the metal cup member 18 and it has an annular flange 23 that engages the bottom of the metal cup member 18 and a second annular flange 24 that engages the sealing member 16. A helical spring 25 is positioned in engagement with the two annular flanges 23 and 24 of the elastomeric sleeve 22. This helical spring serves the purpose of spring loading the annular sealing member 16 into engagement with the annular face 15 of the ceramic sealing member or insert 14.

A shaft 26 is rotatably journaled in the housing 17 by means of bearings 27 and 28 that may be of the permanently lubricated type. The shaft 26 extends through the housing 17, through the metal cup member 18 of the housing, through the annular sealing member 16, through the ceramic sealing member or insert 14, and is secured to the metal hub 13 of the pump impeller 12 by any suitable means, for example, by press fitting. The shaft 26 has sufficient clearance with respect to the metal cup member 18 and the annular sealing member 16 so that it can rotate freely with respect to these elements.

As can be seen by reference to FIGURE 1, the impeller carries a plurality of blades 31 and 32, and the pumping area of the pump assembly 10 is in the immediate vicinity of these blades. The purpose of the ceramic sealing member or insert 14 with its annular face 15 and the sealing member 16 is to provide an annular running seal that will prevent the fluid being pumped, for example, an internal combustion engine coolant, from entering the area of the bearings 27 and 28. As previously pointed out, if the fluid being pumped does reach the bearings 27 and 28, failure of these bearings will occur. It should be noted that the annular face 15 of the ceramic sealing member or insert 14 and the complementary face on the annular sealing member 16 are positioned perpendicularly with respect to the axes of the metal hub 13, the ceramic sealing member or insert 14 and the shaft 26.

The ceramic insert 14 can be conveniently made of aluminum oxide that is approximately 85% pure. The remaining ingredients, such as silicon and other impurities, permit binding of the aluminum oxide into a hard body when passed through a sintering furnace. The metal hub 13 may be constructed of SAE 1010 steel, while conventional phenolic molding compound may be used to form the main body portion 12 of the impeller 11. The annular sealing member 16 may be made of a phenolic molding compound with impurities of carbon and soft metal for lubricating purposes.

Referring now to FIGURE 2, the metal hub 13 and the ceramic sealing member or insert 14 are shown positioned together as they would be in a mold prior to the molding process. It can be seen from this figure that the metal hub 13 has an annular frangible knife-edge 35 positioned in contact with a face 36 of the ceramic sealing member or insert 14 that is positioned opposite the annular face or sealing surface 15. The metal hub 13 is also knurled on its outer periphery as is the ceramic sealing member or insert 14 at various positions on its periphery indicated by the numeral 37. The knurled portions 37 may have a slightly larger diameter than the remainder of the ceramic insert 14 as shown in FIGURE 2. The ceramic insert may also have an annular groove 38 positioned in the face 36, the purpose of which will be described subsequently.

Prior to injecting the phenolic or plastic molding compound into the mold to form the main body portion 12 of the impeller, an axial force is applied on the metal hub 13 and the ceramic sealing member or insert 14 to crush the annular frangible knife-edge 35 against the ceramic sealing member or insert 14 to form an annular seal between these two members. The crushed frangible edge of the metal hub 13 is shown in FIGURE 3, and it provides, in cooperation with the annular face 36 of the ceramic sealing member or insert 14, a seal having a considerable radial thickness. When this operation has been completed the mold is closed and the plastic or phenolic molding compound is injected into the mold around the periphery of the metal hub 13 and the ceramic sealing member or insert 14. The seal formed by the crushed frangible knife-edge 35 and the annular face 36 prevents the phenolic or plastic molding from entering the internal diameter of these two members. This assures a properly molded main body portion 12 of the pump impeller 11 and also assures that the internal diameter of the metal hub 13 and the ceramic insert or sealing member 14 will be free of material so that the shaft 26 can freely enter these two members.

It can be seen also that the knurled edges 37 that are of greater diameter than the remainder of the ceramic insert 14 permit the ceramic insert to be enveloped by the plastic or phenolic molding material and prevent axial and rotary shifting of the ceramic insert 14. The groove 38 prevents transverse shifting of the ceramic insert with respect to the axis of the metal hub 13 and the shaft 26. As can be seen by reference to FIGURE 3, the molding compound of the main body portion 12 extends only about half the axial distance between the annular face 36 and the annular face 15 of the ceramic sealing member or insert 14. This leaves the annular face 15 of the ceramic insert or sealing member 14 exposed so that it can engage the annular sealing member 16.

An alternate embodiment of the invention is shown in FIGURE 4 and the alternate form of the ceramic sealing member or insert 14 used with this embodiment is shown in FIGURE 5. In this alternate embodiment the frangible knife-edge 35 of the metal hub 13 is positioned at the outer diameter thereof, and the ceramic insert or sealing member 14 is provided with grooves 39 at the outer periphery thereof that prevent the transverse shifting of the ceramic insert 14. The knurled portions 37 of the ceramic insert in this case may be tapered as shown at FIGURE 4 so that the phenolic or plastic molding compound forming the main body portion 12 of the impeller 11 envelopes the insert and prevents it from shifting axially.

The invention thus provides a pump impeller that has an exposed ceramic sealing surface molded into a plastic impeller body. The ceramic sealing surface provides a durable and long life seal. This impeller is inexpensive since it uses low cost materials and no finishing operations are required after molding. These features make it ideally suited for use as a water pump impeller on an automotive vehicle. The invention further provides a unique and eminently satisfactory method of constructing the impeller.

It will be understood that the invention is not to be limited to the exact construction shown and described, but that various changes and modifications may be made without departing from the spirit and scope of the invention as defined in the appended claims.

I claim:
1. The method of making a molded pump impeller comprising the steps of placing an annular ceramic insert in a mold, placing a cylindrical metallic hub having an annular frangible edge in the mold with the annular frangible edge in contact with said annular ceramic insert, applying an axial force to said annular ceramic insert and said cylindrical hub to crush said annular frangible edge into sealing contact with said annular ceramic insert, and molding a plastic impeller body around said cylindrical hub and said annular ceramic insert, said annular ceramic insert and said metallic hub having means for cooperation with the molded plastic impeller body to prevent relative motion therebetween.

2. The method of making a molded pump impeller comprising the steps of placing a cylindrical metal hub having a frangible end in contact with an annular ceramic insert, applying an axial force to said cylindrical metal hub and said annular ceramic insert of sufficient magnitude to flatten said frangible end of said metal hub against said annular ceramic insert, and molding a plastic impeller body around said cylindrical metal hub and said ceramic insert, the flattened frangible edge of said cylindrical metal hub in contact with said annular ceramic insert providing a seal against the flow of plastic into the interior of said cylindrical metal hub and said annular ceramic insert, said annular ceramic insert and said metallic hub having means for cooperation with the molded plastic impeller body to prevent relative motion therebetween.

3. The method of making a molded pump impeller comprising the steps of placing an annular ceramic insert in a mold, said annular ceramic insert having a first face and a second face, placing a cylindrical metallic hub having an annular frangible edge in the mold with the annular frangible edge in contact with the first face of said annular ceramic insert, applying an axial force to said annular ceramic seat and said cylindrical hub to crush said annular frangible edge into sealing contact with said annular ceramic insert, and molding a plastic impeller body around the periphery of said cylindrical hub and said annular ceramic insert and leaving said second face of said annular ceramic insert exposed, said annular ceramic insert and said metallic hub having means for cooperation with the molded plastic impeller body to prevent relative motion therebetween.

References Cited

UNITED STATES PATENTS

| | | | |
|---|---|---|---|
| 1,934,239 | 11/1933 | Schopp | 29—527 |
| 2,127,712 | 8/1938 | Bart | 29—527 |
| 2,285,219 | 6/1942 | Morrell | 29—527 |
| 2,411,024 | 11/1964 | Bruun | 29—527 |
| 2,724,864 | 11/1955 | Krotz | 264—276 |
| 2,937,409 | 5/1960 | Cole | 264—276 |
| 2,946,093 | 7/1960 | Everett | 264—276 |
| 3,221,382 | 12/1965 | Haw | 264—262 |
| 3,276,114 | 10/1966 | Blaurock | 29—527 |
| 3,276,115 | 10/1966 | Hansz | 29—527 |

JOHN F. CAMPBELL, *Primary Examiner.*

P. M. COHEN, *Assistant Examiner.*